No. 883,132. PATENTED MAR. 24, 1908.
F. C. GOFF.
APPARATUS FOR TREATING ANIMALS.
APPLICATION FILED NOV. 9, 1907.
3 SHEETS—SHEET 1.
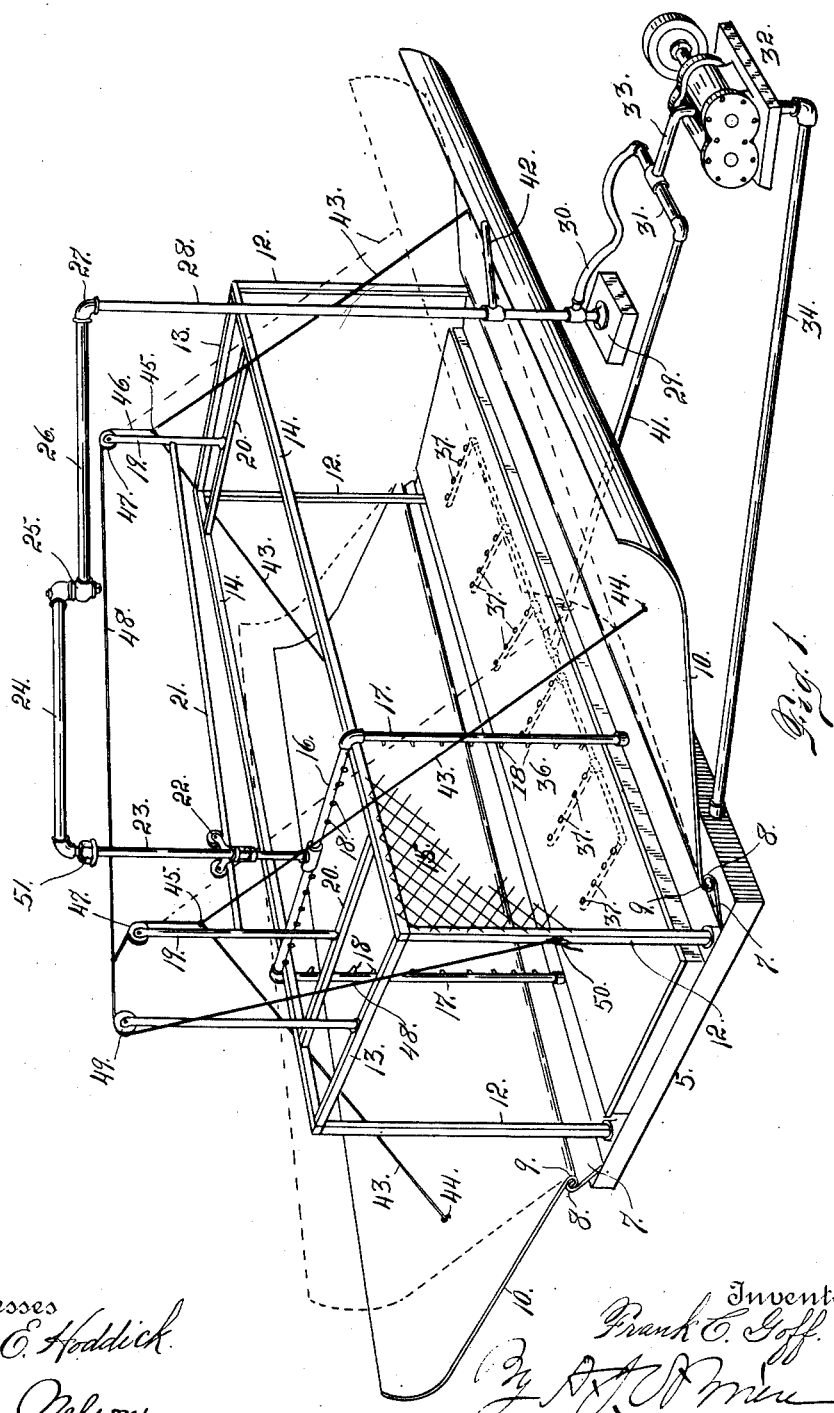

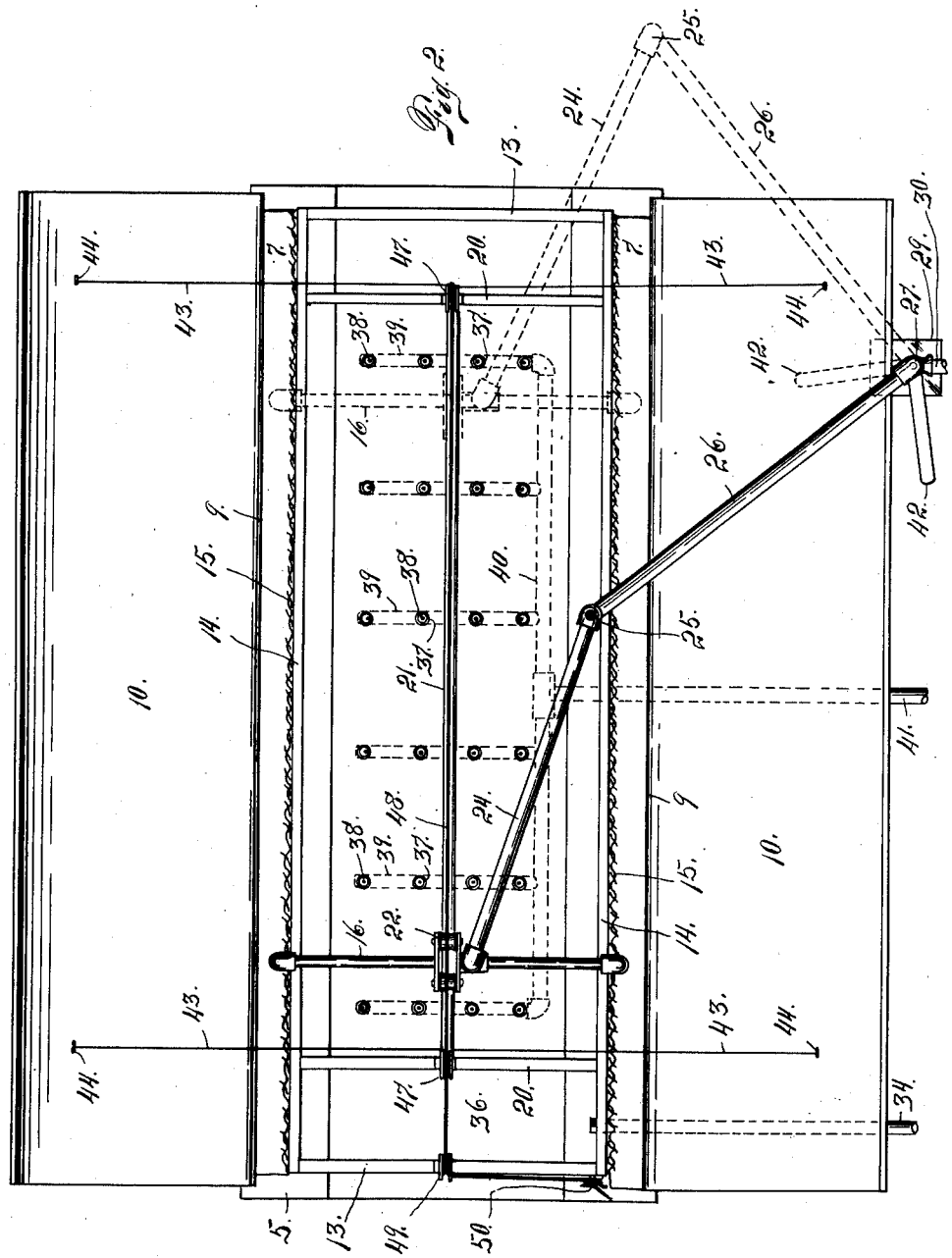

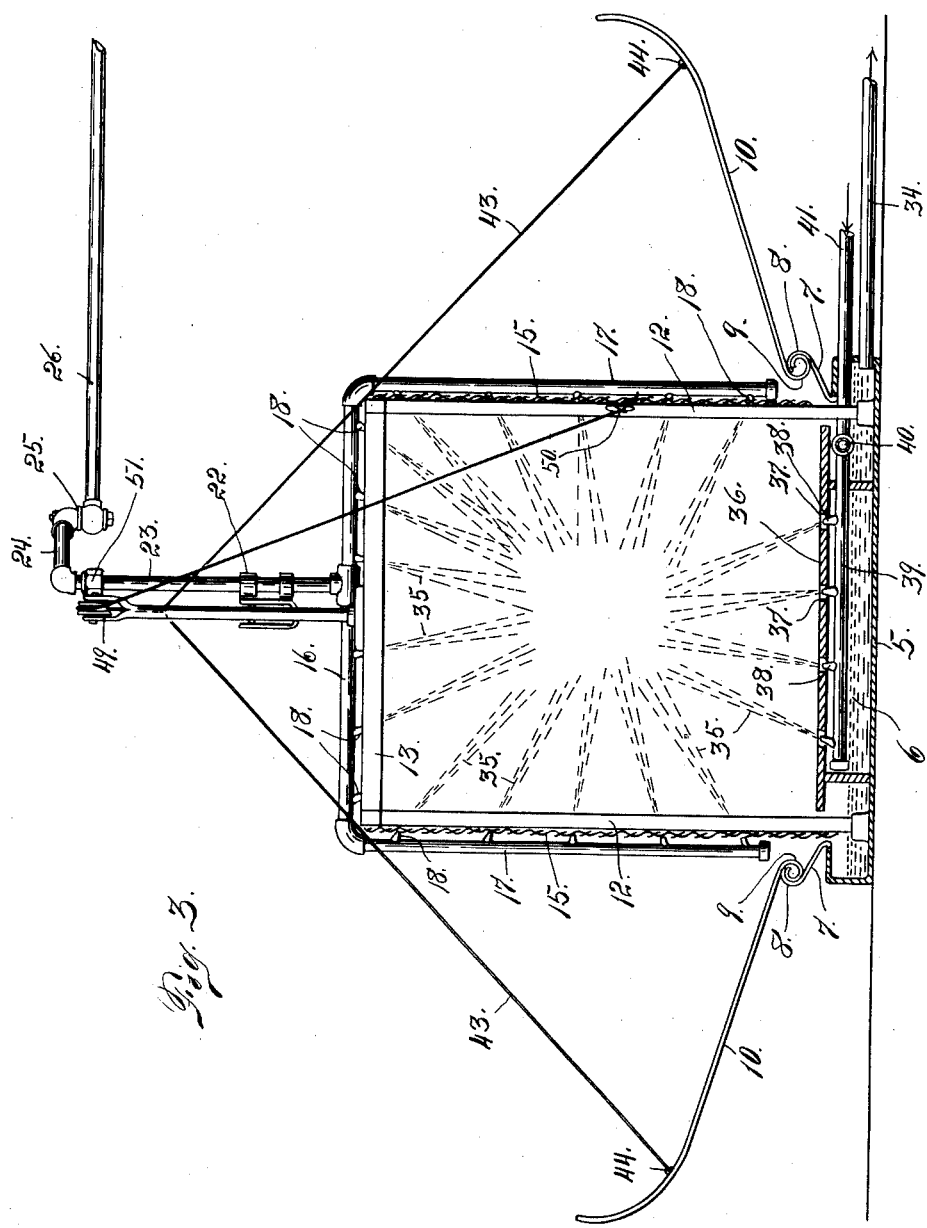

UNITED STATES PATENT OFFICE.

FRANK C. GOFF, OF DENVER, COLORADO.

APPARATUS FOR TREATING ANIMALS.

No. 883,132.  Specification of Letters Patent.  Patented March 24, 1908.

Application filed November 9, 1907. Serial No. 401,434.

*To all whom it may concern:*

Be it known that I, FRANK C. GOFF, a citizen of the United States, residing at the city and county of Denver and State of Colorado, have invented certain new and useful Improvements in Apparatus for Treating Animals; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in apparatus for treating animals, the object being the curing of various skin diseases and for the purpose of destroying the various insects which are lodged in the hair or wool or which attach themselves to the animals.

A further object of the apparatus is the destruction of various diseases and germs as well as the eggs or larvæ of the aforesaid insects. Hence the object of my present improvement is similar to that of the construction disclosed in my previous application Serial No. 383,923, filed July 15th, 1907.

The general function of the machine is the treatment of animals by means of a liquid insecticide delivered or discharged upon their bodies while placed in a suitable inclosure. In my present improvement I make provision for a traveling spraying device, whereby animals as sheep which cannot be made to travel through a runway, may be treated by causing the spraying device to move back and forth upon the runway or inclosure in which they are placed. In my present improvement I also make provision for laterally disposed liquid collecting platforms hinged at the opposite sides of the apparatus, for catching the splash from the sprays as they strike the animals, the sides of the runway or inclosure being sufficiently open to permit the splash to escape. These hinged liquid-collecting platforms may be raised and lowered in order to give them any desired inclination. By lifting the collecting platforms or giving them a greater inclination, the liquid may be caused to return more rapidly to the tank or liquid-containing receptacle. In case the liquid is quite thick for any reason, this inclination of the platforms becomes a very important feature. Furthermore in my present improvement I make provision for covering the sides of the runway with a wire netting through which the sprays from the spraying devices may be passed.

Having briefly outlined my improved construction, I will proceed to describe the same in detail reference being made to the accompanying drawing in which is illustrated an embodiment thereof.

In this drawing, Figure 1 is a perspective view of my improved apparatus. Fig. 2 is a top plan view of the same. Fig. 3 is an end elevation of the apparatus shown partly in section.

The same reference characters indicate the same parts in all the views.

Let the numeral 5 designate a tank containing a liquid insecticide 6. The opposite sides of this tank are provided with inclined flanges 7 whose free edges are curved as shown at 8, whereby they are caused to interlock with the curved lower edges 9 of the platforms 10, this interlocking of the said parts forming a hinge whereby the inclination of the platforms may be changed at will. A suitable frame work is erected above this tank and as shown in the drawing is composed of upright posts 12 connected at the top by transverse bars 13 and longitudinally disposed bars 14. This frame work may of course be of any suitable construction and composed of any desired material. Attached to the sides of the frame work is a wire netting 15 which as shown in the drawing is sufficiently coarse to allow the sprays from the nozzles arranged alongside the apparatus to pass therethrough. As shown in the drawing this spraying device consists of a U-shaped pipe placed in the inverted position and composed of a transverse top member 16 and two depending members 17. The member 16 extends entirely across the top of the frame work or structure while the depending members 17 have a length equal to the height of the structure. All the members of this spraying device are equipped with spray nozzles 18 through which the liquid delivered to the tubular spraying device under pressure issues and enters the runway or inclosure surrounded by the frame work.

Projecting from the top of the frame work are two upright posts 19 which rest upon transverse bars 20 supported by the longitudinal top bars 14 of the structure. These uprights 19 are connected about midway of their length by a bar 21 which forms a track which a trolley 22 engages, the said trolley being connected with one side of an upright pipe 23 whose lower extremity is attached to the top member 16 of the U-shaped spraying device. By virtue of the aforesaid construction, the spraying device is mounted to travel back and forth lengthwise of the frame work, being suspended by virtue of the engagement of the trolley 22 with the track 21. Rigidly attached to the upper extremity of the pipe 23, is a pipe 24 extending at right angles to the pipe 23 and projecting outwardly toward one side of the frame work, its outer extremity having a swiveled connection 25 with a manipulating pipe 26, the latter being rigidly connected as shown at 27 with an upright pipe 28 whose lower extremity is journaled in a suitable base 29. The lower part of this pipe is connected by means of a hose 30 with a feed pipe 31 connected with a pump 32 by means of a branch pipe 33. A pipe 34 also leads from the liquid in the tank to the pump, whereby during the operation of the latter the liquid is drawn from the tank and discharged through the hose pipe 30 into the pipe members 28, 26, 24 and 23 being thence delivered to the U-shaped spraying device from which it passes into the inclosure in the form of sprays 35.

Mounted directly above the central portion of the tank, is a platform 36 upon which the animals to be sprayed are located. This platform is provided with openings 37 which are entered by spray nozzles 38 attached to transverse pipes 39 connected with a longitudinal pipe 40 which is fed by a pipe 41 communicating with the feed pipe 31. Hence it will be understood during the spraying operation, that the sprays are simultaneously delivered to the U-shaped spraying device and also to the underneath spray pipes whereby sprays are delivered to the animals not only from both sides of the apparatus but also from above and below. The upright pipe 28 is adapted to be given a partial rotation in any suitable manner. As shown in the drawing it is provided with a lever arm 42 whereby it may be actuated by hand for the purpose of causing the U-shaped spraying apparatus to travel lengthwise of the frame, the same being suspended by the track 21 upon which the trolley 22 travels. It will be understood that as a partial rotary movement is given to the upright pipe 28, the pipe member 26 will act as a crank arm to impart the aforesaid movement to the spraying device through the pipe members 23 and 24, the members 24 and 26 having a swiveled connection as heretofore explained.

The platforms 10 may be manipulated in any suitable manner. As shown in the drawing cables 43 are connected with the respective platforms 10 at points 44, there being two of these cables connected with each platform as the apparatus is illustrated in the drawing. The upper extremities of each pair of cables 43 are connected as shown at 45 with a single cable 46 passing upwardly over a pulley 47 mounted on the upper extremity of a post 19. One cable 46 merges into a top cable 48 while the other cable 46 is connected with the top cable 48 which finally passes over a guide pulley 49 at one extremity of the apparatus and thence down to a fastening device 50 attached to a post 12 of the frame work.

From the foregoing description the use and operation of my improved apparatus will be readily understood. Assuming that animals are within the inclosure composed of the frame work and the wire netting, if it is desired to drive them therethrough, the spraying device may remain stationary and the liquid insecticide in spray form delivered upon them as they pass along. If on the other hand the animals will not travel through the inclosure but lie down, the U-shaped spraying device may be moved back and forth upon the frame work while the sprays are delivered to the animals within the inclosure until they are thoroughly treated, the travel of the U-shaped devices being effected by imparting a partial rotation to the standpipe 28, the same being connected with the U-shaped spraying device as heretofore explained. Before commencing the operation, the side platforms 10 may be adjusted to give them the desired inclination in order to catch the liquid splash as the sprays strike the animals, the splash being returned to the tanks as it runs down the platforms. Simultaneously with the delivery of the sprays upon the animals by the use of the traveling U-shaped spraying device, they are treated by upwardly directed sprays issuing from the nozzles 38 which enter openings in the bottom platform 36 as heretofore explained.

The manner of manipulating the traveling spraying device is illustrated in Fig. 2, in which the said spraying device and its operating connections are shown in two positions, one position being in full lines and the other in dotted lines.

Having thus described my invention, what I claim is:

1. The combination with a suitable frame work, of a spraying device mounted to travel thereon, substantially as described.

2. The combination with an inclosure in which animals may be placed, of a spraying device mounted to travel in such proximity thereto that the sprays issuing therefrom may be caused to enter the inclosure, substantially as described.

3. The combination with an inclosure, of a spraying device provided with nozzles directed into the inclosure, the spraying device being mounted to travel in suitable proximity to the inclosure, substantially as described.

4. The combination with a suitable frame work, of a spraying device provided with a trolley, a track engaged by the trolley whereby the spraying device is movably mounted, and suitable means for manipulating the spraying device whereby the trolley is caused to travel upon the track, substantially as described.

5. In apparatus of the class described, the combination with a suitable frame work, of a wire netting attached to the sides of the frame work, and a spraying device exteriorly arranged and adapted to deliver sprays through the wire netting and into the inclosure, substantially as described.

6. The combination with an inclosure composed of a frame work having sides composed of wire netting, and a traveling spraying device arranged exteriorly of the frame work and adapted to deliver liquid in the form of sprays or jets through the wire netting into the inclosure, substantially as described.

7. In an apparatus for treating animals, the combination with an inclosure, of hinged platforms arranged along the sides of the inclosure, means for delivering liquid in the form of sprays into the inclosure, whose sides are sufficiently open to permit the liquid splash to pass therethrough, the said splash being caught by the said platforms, substantially as described.

8. The combination with an inclosure adapted to contain animals, of a bottom liquid-containing tank, hinged platforms arranged along the opposite sides of the tank, means for delivering liquid in the form of sprays into the inclosure, the platforms being adapted to catch the liquid splash resulting from the said sprays and return the same to the tank, substantially as described.

9. The combination with an inclosure having a bottom tank, of platforms hinged to the opposite sides of the tank, and means for regulating the inclination of the platforms, substantially as described.

10. The combination with an inclosure, a tank arranged underneath the inclosure, platforms hinged to the opposite sides of the tank, means for delivering liquid in the form of sprays into the inclosure, the platform being adapted to collect the liquid splash and return it to the tank, and suitable means for manipulating the platforms whereby their inclination may be regulated, substantially as described.

11. The combination with an inclosure, of means for delivering liquid in the form of sprays into the inclosure, and hinged platforms arranged along the opposite sides of the inclosure and adapted to catch the liquid which passes beyond the inclosure, substantially as described.

12. The combination with an inclosure, of means for delivering liquid in the form of sprays into the inclosure, hinged platforms arranged along the opposite sides of the inclosure and adapted to catch the liquid which passes beyond the inclosure, and means for adjusting the inclination of the platforms, substantially as described.

In testimony whereof I affix my signature in presence of two witnesses.

FRANK C. GOFF.

Witnesses:
 DENA NELSON,
 A. J. O'BRIEN.